United States Patent Office 2,892,726
Patented June 30, 1959

2,892,726

GLASS COMPOSITION

John J. Smith, Brackenridge, and Earl T. Middleswarth, New Kensington, Pa., assignors to Pittsburgh Plate Glass Company No Drawing. Application October 28, 1955
Serial No. 543,588

6 Claims. (Cl. 106—52)

This invention relates to a highly colored ultraviolet and infrared absorbing ophthalmic glass and it has particular relation to such glass containing selenium and iron oxide in combination with glass forming oxides to produce a readily reproducible warm, rose smoke color in the glass.

Glasses with relatively low transmissions in the visible spectrum and with controlled absorptive properties in the ultraviolet and infrared regions are desired as overlays, or the like, in the ophthalmic field. It is known that glasses of this type having a warm, rose smoke color are producible by the inclusion of selenium and iron oxide in lime-soda-silica or lime-soda-potash-silica glasses. These glasses are set forth in U.S. Patent No. 2,524,719.

It is stated in the patent that careful control of the ingredients and melting conditions in making such glasses is necessary in order to obtain the proper transmission and absorption properties in the glasses. It is taught that the glasses shall be produced under reducing conditions in the melting furnace or container and that reducing agents such as carbon, graphite, silicon carbide, oxalates and the like are to be employed. In addition, the selenium must be retained in the melt in the proper amount and form to obtain the proper color in the finished glass. In actual practice, it has been found to be virtually impossible to control the colors that result from the melting of these batches and the color varies considerably from melt to melt.

In accordance with the present invention, it has been discovered that if selenium and iron oxide are introduced into a lime-free base glass, which glass is essentially a soda-barium-silica or soda-potash-barium-silica glass, highly colored glasses can be produced and the colors and absorptive properties can be controlled. When the combination of selenium with iron oxide is introduced into a properly compounded base glass containing mixed alkalis, barium oxide and silica, it has been found that although the infrared absorptive properties and the total luminous transmittance properties depend upon the oxidation-reduction balance of the melt, the color of the glass (due to absorption in the visual region) is insensitive to moderate changes of this type. This is especially the case with very dense glasses having a luminous transmittance of about 20 percent at a thickness of about 1 millimeter and having a warm, rose smoke shade.

With such glasses, a relatively high transmittance at 700 mmu is required in comparison to the transmittance in the blue end of the spectrum at about 450 mmu and in the infrared portion of the spectrum at about 1100 mmu. It has been discovered that while the warm color is only very poorly reproducible in the ordinary soda-lime-silica glass, it is easily reproducible in the alkali-barium-silica glass. Thus, by the use of an alkali-barium-silica glass with selenium and iron oxide, a method of controlling the color and absorptive properties from batch to batch has been achieved.

Examples of the glasses of the present invention and the ranges of the ingredients of suitable glasses are set forth in the table below wherein the percentages are by weight:

Table I

| Ingredient | Compositions | | | Range |
|---|---|---|---|---|
| | 1 | 2 | 3 | |
| $SiO_2$ | 64.4 | 64.2 | 66.3 | 60-70 |
| $Na_2O$ | 5.5 | 6.5 | 5.7 | 1-15 |
| $K_2O$ | 6.3 | 6.2 | 6.4 | 0-8 |
| $BaO$ | 12.3 | 12.3 | 12.6 | 8-15 |
| $ZnO$ | 2.8 | 2.8 | None | 0-6 |
| $F_2$ | 1.1 | None | 1.1 | 0-1.5 |
| $Fe_2O_3$[2] | 8.0 | 8.0 | 8.3 | 5-10 |
| $CoO$ | .014 | .013 | .015 | 0-.04 |
| $Se$ | .034 | .033 | .035 | .01-.05 |
| | 100.448 | 100.046 | 100.450 | |
| less $O_2$ correction [1] | 0.4 | | 0.4 | |

Note:
[1] Oxygen correction made for equivalent amount of fluorine where necessary.
[2] Presence of ferrous iron is acknowledged but ratio of ferric to ferrous iron has not been determined.

The fluorine is introduced as sodium silica fluoride, essentially $Na_2SiF_6$, or as other stable fluorides. The fluorine shown in the compositions in Table I is understood to be present in the glass in some combined form but not as a gas. It is not known exactly how this fluorine is combined, but it is assumed to be combined in place of some of the oxygen. In tabulated glass compositions it is customary to list the oxides. In this case, where some fluorine is present, it is convenient to show its amount in percent by weight as fluorine and then subtract from the sum total percentage its stoichiometric equivalent of oxide in percent by weight.

The amount of the various ingredients set forth above should be maintained within the ranges stated in order to provide the glass with the desired color and transmittance properties. The sum of the alkali metal oxides, i.e., $Na_2O$ and $K_2O$ should be between 9 to 15 percent by weight of the glass to achieve the desired results. It is desired that the glass be substantially free of $CaO$, with the exception of such small amounts as may be present in the form of batch impurities. It is contemplated that the glass contain small amounts of other colorants such as oxides of cobalt, nickel, didymium and cerium to give the glass a warmer or colder tint. The didymium oxide is an unseparated mixture of the oxides of neodymium and praseodymium. Either of these latter named oxides may be employed individually in place of didymium to obtain the desired coloring effect. These colorants are used in very small amounts in combination with the selenium and iron oxide.

The glasses of the invention may be produced from conventional glass making materials properly compounded and thoroughly mixed so as to yield, when reacted, glass of the desired ultimate composition. The selenium may be incorporated into the batch as selenium metal, as sodium selenite ($Na_2SeO_3$), or barium selenite ($BaSeO_3$) or iron selenide ($FeSe$). Various size pots, or crucibles, may be employed and the melting temperatures and times will vary according to the amount being formed. The temperatures and melting conditions herein recited may be employed to make 85 to 100 pounds of glass in a refractory pot in a furnace heated by the controlled combustion of natural gas.

An empty pot is preheated in the furnace at a furnace temperature of about 2200° F. A portion of the mixed batch is ladled into the preheated pot and the furnace temperature is gradually increased. The remaining portion of the mixed batch is ladled into the pot over a period of 2¼ hours and the temperature is gradually raised to about 2600° F. during this time. The furnace temperature is further increased to 2650 to 2670° F. over the next hour, during which time substantially all the glass making materials are melted.

A refractory thimble supported by a water-cooled core and driving arm is then inserted in a vertical position in the molten mass within the pot. The glass is stirred by mechanically propelling the refractory thimble through the glass in a circular or spiral motion. Mechanical stirring is continued and the temperature of 2650 to 2670° F. is maintained for another 2½ hours during which time the chemical reactions are completed, the glass is substantially freed of bubbles and is homogenized.

In the preparation of the glasses of the present invention, it is desired that the glass be produced under neutral conditions in the melting furnace or container, although fluctuations in the oxidation-reduction balance are permissible and have remarkably little influence on the color of the glass. During the melting and high temperature refining operations just described above, an oxidizing atmosphere is maintained within the furnace.

After the glass is refined, the temperature of the glass is reduced slowly over a one hour period to about 2200° F. The stirring action is slowed or may be interrupted for a time during this cooling. The furnace temperature is then maintained at about 2200° F. and stirring is continued at a slow rate for about one-half hour. The stirring thimble is removed from the refined glass and the pot is removed from the furnace. The glass is poured on a metal table and is rolled into the form of a plate. The plate is placed in a kiln and cooled from 1000° F. to 800° F. at a rate of 3° F. per minute. Thereafter, it is cooled more rapidly to room temperature and subsequently cut into pieces suitable for fabrication or tests.

The glasses set forth in Table I were tested for transmittance properties and these are shown in the following table:

*Table II*

| Transmittance Properties | Compositions | | |
|---|---|---|---|
| | 1 | 2 | 3 |
| Glass thickness in millimeters | 0.97 | 0.97 | 1.00 |
| Luminous Transmittance for Illuminant "C" | 23.9 | 18.3 | 20.1 |
| Trichromatic Coefficients: | | | |
| $x$ | .4079 | .4272 | .4161 |
| $y$ | .3995 | .4078 | .3945 |
| $z$ | .1926 | .1650 | .1894 |
| Excitation Purity in percent | 48.3 | 56.1 | 49.4 |
| Dominant Wavelength in millimicrons | 579.8 | 580.9 | 581.8 |
| Total Solar Ultraviolet Transmittance in percent | 0.8 | 0.3 | 1.1 |
| Total Solar Infrared Transmittance in percent | 23.8 | 14.5 | 16.6 |
| Total Solar Energy Transmittance in percent | 24.3 | 16.9 | 19.2 |

Table II illustrates partially the range of colors within which the glasses of this invention lie. All of the glasses are very dark, having a luminous transmittance of about 20 percent at a thickness of about 1 millimeter and having a warm rose smoke color. If the C.I.E. system of color description is used, the color can be expressed as lying between 40 and 60 percent excitation purity and between 578 and 583 millimicrons' dominant wavelength.

To show more completely the reproducibility of color obtained with glasses of this invention, Table III, which follows, presents transmittance and color data on repeat runs of Examples 1 and 3 from Table I.

*Table III*

| Transmittance Properties | Compositions | | | | |
|---|---|---|---|---|---|
| | 1(a) | 1(b) | 1(c) | 3(a) | 3(b) |
| Glass thickness in millimeters | 0.97 | 0.97 | 0.98 | 1.00 | 0.98 |
| Luminous Transmittance for Illuminant "C" | 23.9 | 20.5 | 23.0 | 20.1 | 21.5 |
| Trichromatic Coefficients: | | | | | |
| $x$ | .4079 | .4082 | .4067 | .4161 | .4167 |
| $y$ | .3995 | .3989 | .3986 | .3945 | .3931 |
| $z$ | .1926 | .1929 | .1947 | .1894 | .1902 |
| Excitation Purity in percent | 48.3 | 48.5 | 48.0 | 49.4 | 49.3 |
| Dominant Wavelength in millimicrons | 579.8 | 579.9 | 579.8 | 581.8 | 582.3 |
| Total Solar Ultraviolet Transmittance in percent | 0.8 | 0.6 | 0.7 | 1.1 | 1.1 |
| Total Solar Infrared Transmittance in percent | 23.8 | 15.7 | 21.0 | 16.6 | 20.5 |
| Total Solar Energy Transmittance in percent | 24.3 | 18.4 | 22.4 | 19.2 | 22.0 |

Table III shows that with three separate meltings (a, b, c) of composition 1, a remarkable similarity of dominant wavelengths and excitation purities exists. Two different meltings (a, b) of composition 3 also illustrate the very good color reproducibility of this glass. The infrared transmittance of all five glasses is particularly interesting in that, as an indicator of the amount of ferrous iron present, it shows clearly that the oxidation-reduction balance of the glasses fluctuates considerably. Thus, is demonstrated the color stability of an alkali-barium-silica glass and its superiority over an alkali-lime-silica glass such as described in U.S. Patent 2,524,719 wherein careful control of the melting conditions and oxidation-reduction balance is necessary to obtain the proper warm, rose smoke color.

Although the present invention has been described with respect to specific details of certain embodiments, it is not intended that such details act as limitations upon the scope of the invention except insofar as included in the accompanying claims.

We claim:
1. A glass consisting essentially of the following ingredients in percent by weight: 60 to 70 percent $SiO_2$, 1 to 15 percent $Na_2O$, 0 to 8 percent $K_2O$, the sum of alkali metal oxide being 9 to 15 percent, 8 to 15 percent BaO, 5 to 10 percent $Fe_2O_3$ and 0.01 to 0.05 percent Se, the above listed essential ingredients plus small amounts of colorants constituting 100 percent by weight of the glass.

2. A glass consisting essentially of the following ingredients in percent by weight: 60 to 70 percent $SiO_2$, 1 to 15 percent $Na_2O$, 0 to 8 percent $K_2O$, the sum of alkali metal oxide being 9 to 15 percent, 8 to 15 percent BaO, up to 6 percent ZnO, 5 to 10 percent $Fe_2O_3$ and 0.01 to 0.05 percent Se, the above listed essential ingredients plus small amounts of colorants constituting 100 percent by weight of the glass.

3. A glass consisting essentially of the following ingredients in percent by weight: 60 to 70 percent $SiO_2$, 1 to 15 percent $Na_2O$, 0 to 8 percent $K_2O$, the sum of alkali metal oxide being 9 to 15 percent, 8 to 15 percent BaO, 0 to 6 percent ZnO, 5 to 10 percent $Fe_2O_3$, 0.01 to 0.05 percent Se, 0 to 1.5 percent $F_2$ and up to 0.04 CoO, the above listed essential ingredients plus small amounts of colorants constituting 100 percent by weight of the glass.

4. A glass having substantially the following ingredients in percent by weight: 64.4% $SiO_2$, 5.5% $Na_2O$, 6.3% $K_2O$, 12.3% BaO, 2.8% ZnO, 1.1% $F_2$, 8.0% $Fe_2O_3$, .014% CoO and .034% Se, the total exceeding 100 percent by an amount of oxygen stoichiometrically equivalent to the amount of fluorine present.

5. A glass having substantially the following ingredients in percent by weight: 64.2% $SiO_2$, 6.5% $Na_2O$, 6.2%

$K_2O$, 12.3% $BaO$, 2.8% $ZnO$, 8.0% $Fe_2O_3$, .013% $CoO$ and .033% $Se$.

6. A glass having substantially the following ingredients in percent by weight: 66.3% $SiO_2$, 5.7% $Na_2O$, 6.4% $K_2O$, 12.6% $BaO$, 1.1% $F_2$, 8.3% $Fe_2O_3$, .015% $CoO$ and .035% $Se$, the total exceeding 100 percent by an amount of oxygen stoichiometrically equivalent to the amount of fluorine present.

References Cited in the file of this patent

UNITED STATES PATENTS

| | | |
|---|---|---|
| 2,416,392 | Hood | Feb. 25, 1947 |
| 2,469,490 | Armistead | May 10, 1949 |
| 2,524,719 | Tillyer | Oct. 3, 1950 |
| 2,552,495 | Poole | May 8, 1951 |
| 2,688,559 | Armistead | Sept. 7, 1954 |